(12) United States Patent
Larson et al.

(10) Patent No.: US 9,842,456 B2
(45) Date of Patent: Dec. 12, 2017

(54) VENDING MACHINE FOR CREATING AND DISPENSING PERSONALIZED ARTICLES

(71) Applicant: Xerox Corporation, Norwalk, CT (US)

(72) Inventors: James Rodney Larson, Fairport, NY (US); George A. Gibson, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/789,135

(22) Filed: Jul. 1, 2015

(65) Prior Publication Data

US 2017/0004669 A1     Jan. 5, 2017

(51) Int. Cl.
| | |
|---|---|
| B41J 11/00 | (2006.01) |
| G01D 15/24 | (2006.01) |
| G07F 17/26 | (2006.01) |
| B41J 2/32 | (2006.01) |
| G06Q 20/18 | (2012.01) |

(52) U.S. Cl.
CPC ............... G07F 17/26 (2013.01); B41J 2/32 (2013.01); G06Q 20/18 (2013.01)

(58) Field of Classification Search
None
See application file for complete search history.

(56) References Cited

U.S. PATENT DOCUMENTS

| | | | | |
|---|---|---|---|---|
| 3,931,761 | A * | 1/1976 | Carrus | B41J 2/425 101/66 |
| 5,561,604 | A * | 10/1996 | Buckley | G07F 17/26 347/2 |
| 5,778,164 | A | 7/1998 | Watkins et al. | |
| 5,923,406 | A | 7/1999 | Brasington et al. | |
| 2005/0167487 | A1 * | 8/2005 | Conlon | G07F 17/26 235/380 |
| 2005/0179721 | A1 * | 8/2005 | Jones | B41J 2/335 347/19 |
| 2006/0293966 | A1 * | 12/2006 | Inouye | G06Q 20/045 705/27.1 |
| 2007/0211135 | A1 * | 9/2007 | Moreland | B41J 2/32 347/221 |
| 2008/0249658 | A1 * | 10/2008 | Walker | G07F 9/02 700/236 |
| 2011/0028199 | A1 * | 2/2011 | Luciano, Jr. | G07F 17/42 463/17 |
| 2011/0272934 | A1 * | 11/2011 | Lundgren | A63F 3/0655 283/101 |

(Continued)

*Primary Examiner* — Matthew Luu
*Assistant Examiner* — Tracey McMillion
(74) *Attorney, Agent, or Firm* — Fox Rothschild LLP

(57) ABSTRACT

A system for dispensing customized articles may include a vending machine that includes an article holding area having one or more articles that each include a film on at least a portion of the article, an energy generating print device, a processor, and a computer-readable storage medium. The computer-readable storage medium may include one or more programming instructions that, when executed, cause the processor to receive an indication of a selected article, receive a selection of one or more content items to be printed on the selected article, and cause the energy generating print device to apply energy to the portion of the selected article having the film. Applying such energy may cause a visual representation of the selected content items to be displayed on the portion of the selected article.

10 Claims, 5 Drawing Sheets

(56) References Cited

U.S. PATENT DOCUMENTS

2015/0028094 A1   1/2015  Will et al.
2015/0042737 A1*  2/2015  Tsutsui ................. B41M 7/0027
                                                  347/105

* cited by examiner

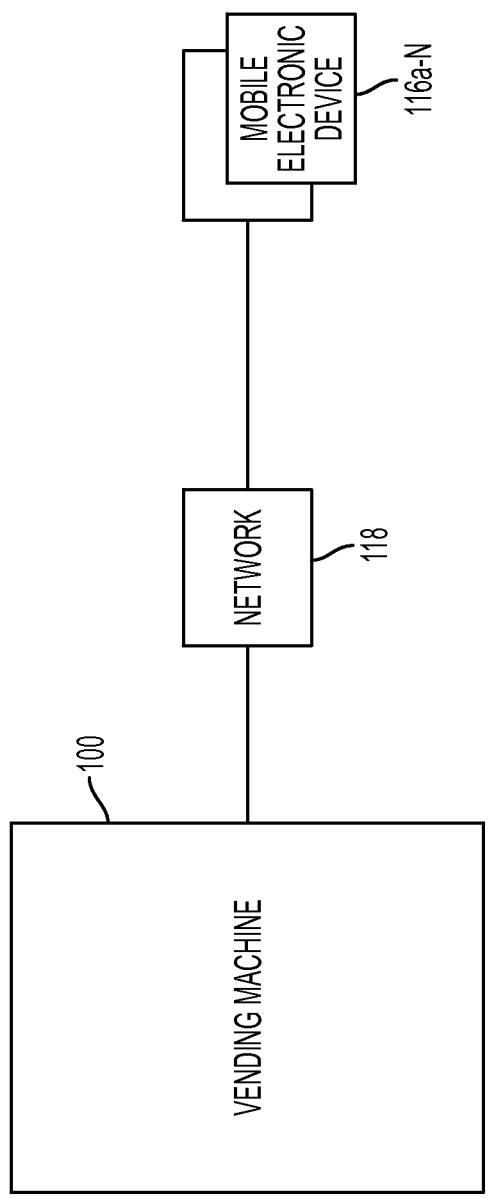

VENDING MACHINE FOR CREATING AND DISPENSING PERSONALIZED ARTICLES

BACKGROUND

Creating personalized or customized articles, such as mementos or gifts, is often a time intensive process and one that is typically not performed on an on-demand basis due to the sophisticated software and equipment that is involved.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. As used herein, the term "comprising" means "including, but not limited to."

In an embodiment, a system for dispensing customized articles may include a vending machine that includes an article holding area having one or more articles that each include a film on at least a portion of the article, an energy generating print device, a processor, and a computer-readable storage medium. The computer-readable storage medium may include one or more programming instructions that, when executed, cause the processor to receive an indication of a selected article, receive a selection of one or more content items to be printed on the selected article, and cause the energy generating print device to apply energy to the portion of the selected article having the film. Applying such energy may cause a visual representation of the selected content items to be displayed on the portion of the selected article.

In an embodiment, a method of dispensing a customized article may include receiving, by a processor of a vending machine, an indication of a selected article, receiving a selection of one or more content items to be printed on the selected article, causing, by the processor, an energy generating printing device of the vending machine to apply energy to the portion of the selected article having the film, where applying such energy causes a visual representation of the selected content items to be displayed on the portion of the selected article, and causing the selected article to be positioned in a dispensing portion of the vending machine.

BRIEF DESCRIPTION OF THE DRAWINGS

FIG. 1 illustrates an example vending machine system according to an embodiment.

DETAILED DESCRIPTION

The following terms shall have, for purposes of this application, the respective meanings set forth below:

An "article" refers to a physical item having an exterior portion on which custom printing may be applied. Example articles may include, without limitation, food or beverage containers, bottles, cups, articles of clothing, signs, containers and/or the like.

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like.

A "content item" is a visual characteristic of an article. For example, content items may include pictures, graphics, text, backgrounds, patterns, shading, shadowing, colors, color schemes, fonts, line types, embossing, cutouts, monograms, silhouettes and/or the like.

A "vending machine" refers to an electronic device that dispenses at least one article.

FIG. 1 illustrates an example vending machine system according to an embodiment. As illustrated by FIG. 1, a vending machine 100 may be in communication with a one or more mobile electronic devices 116a-N via a communication network 118. For instance, a mobile electronic device 116a-N may include an application that may facilitate communication between the mobile electronic device and a vending machine 100. A communication network 118 may be a local area network (LAN), a wide area network (WAN), a mobile or cellular communication network, an extranet, an intranet, the Internet and/or the like.

Figure 2A:
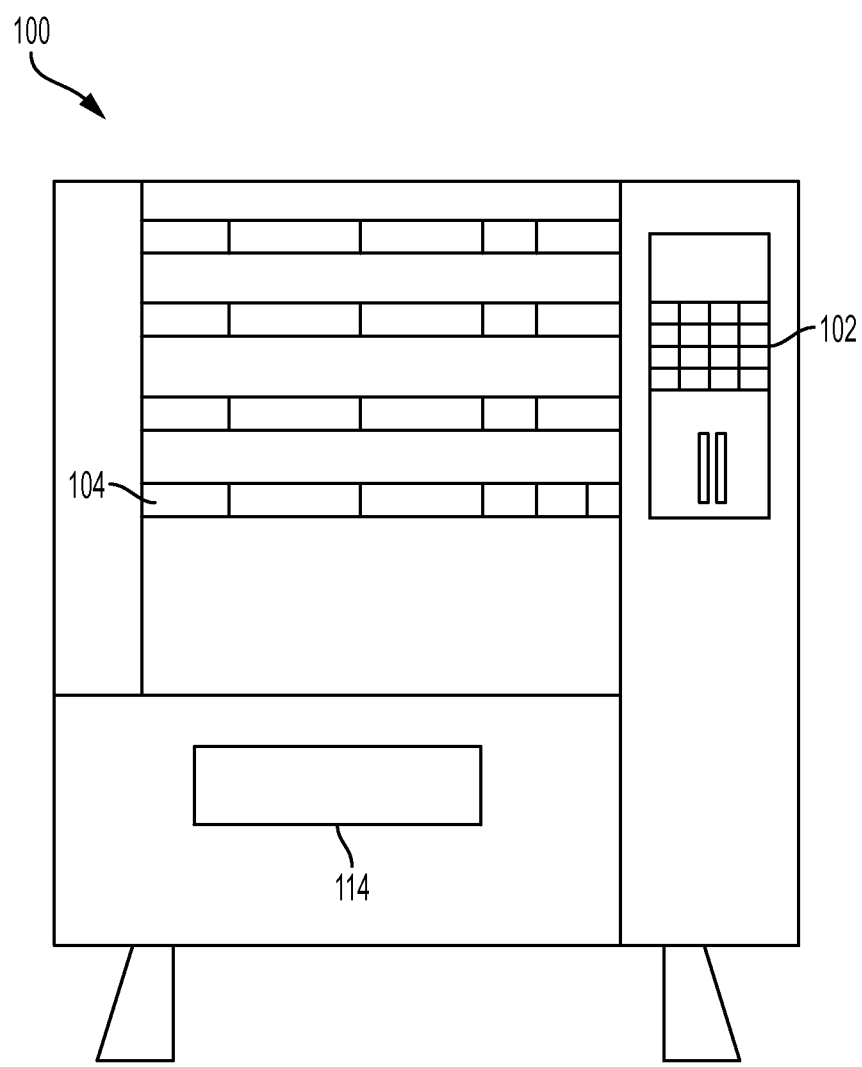
FIGS. 2A and 2B illustrate an example vending machine according to various embodiments.
Figure 2B:
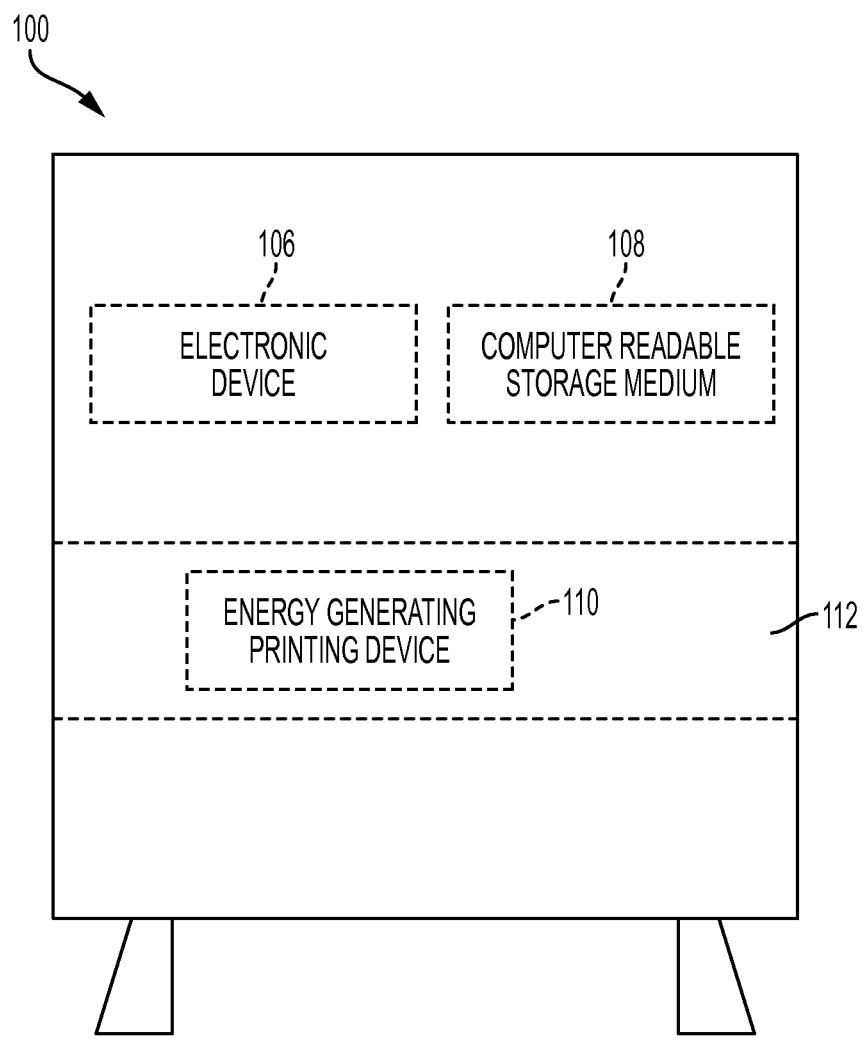

FIGS. 2A and 2B illustrate a front and a rear perspective, respectively, of an example vending machine according to an embodiment. As illustrated by FIGS. 2A and 2B, a vending machine 100 may include a user interface 102, an article holding area 104, an electronic device 106, such as a processor, a computer-readable storage medium 108, an energy generating print device 110, a printing area 112, and a dispensing portion 114.

At least a portion of a user interface 102 may be located on an external portion of the vending machine 100. A user interface 102 may include one or more display screens and/or one or more input devices such as, for example, a touch screen, a key pad, voice-activated input device and/or the like. In some embodiments, a user interface may include a payment interface such as, for example, a currency collection machine, a credit card terminal and/or the like. In certain embodiments, a user interface 102 may include a camera.

In an embodiment, an article holding area 104 may be located in the interior of a vending machine 100. In some embodiments, at least a portion of an article holding area 104 may be visible from outside the vending machine. In other embodiments, an article holding area 104 may not be visible from outside the vending machine. An article holding area 104 may be a space of area within a vending machine where articles that have yet to be selected, purchased or otherwise processed are stored. In some embodiments, an article holding area may include one or more slots, bins, compartments and/or the like where articles may be kept.

In various embodiments, an electronic device 106 may be in communication with a user interface 102. For instance, an electronic device 106 may receive input from a user interface. In an embodiment, an electronic device 106 may be in communication with a printing device 110. A printing device 110 may be a device that is capable of transposing one or more images onto one or more articles. In an embodiment, a printing device 110 may be capable of performing one or more direct digital marking techniques in order to print a design on an article. A direct digital marking technique may involve selectively applying energy to a film on an article to generate one or more images. Examples of direct digital marking techniques may include, without limitation, ZINK® printing technology, Datalase® technology, thermal energy, radiant energy, mechanical energy, and/or the like.

ZINK® printing technology utilizes a ZINK-enabled printer and ZINK Paper® to generate full-color output without using ink. Heat from a ZINK-enabled printer activates color-forming crystals that are embedded in layers of the ZINK Paper®. ZINK Paper® includes multiple layers that include cyan, yellow and magenta dye crystals, and a protective polymer overcoat layer. Before heat is applied, the crystals appear clear. However, when heat from a ZINK-enabled printer is applied to the ZINK Paper®, the dye crystals change color depending on the intensity and duration of the heat that is applied.

Datalase® technology utilizes color change materials that can be applied as a coating or incorporated into a substrate. When low power $CO_2$ laser light is applied to the material, it generates a color change in the pigment.

In certain embodiments, the application of energy to a film of an article may occur in a printing area 112 of a vending machine. Once an article is completed, it may be dispensed to a consumer via a dispensing area 114 of a vending machine.

Figure 3:
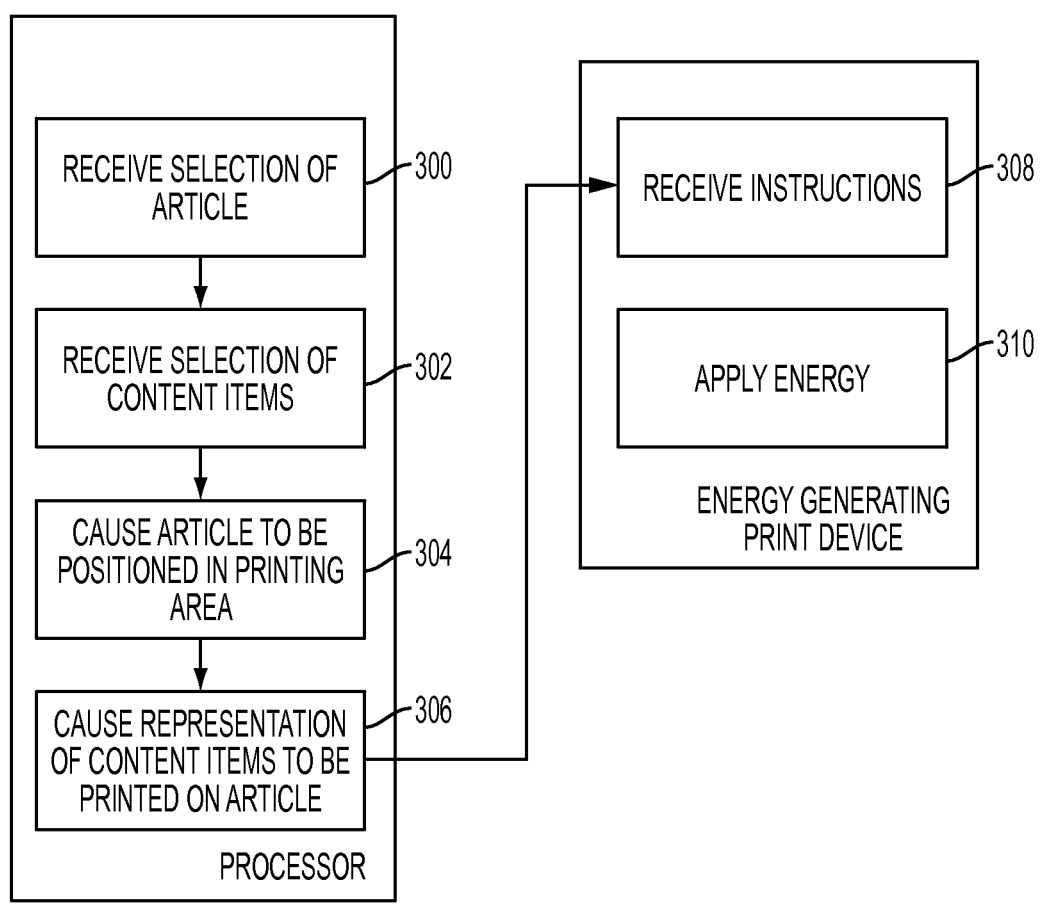
FIG. 3 illustrates a flow chart of an example method of selecting an article from a vending machine according to an embodiment.

FIG. 3 illustrates a flow chart of an example method of selecting an article from a vending machine according to an embodiment. As illustrated by FIG. 3, a processor of a vending machine may receive 300 an indication of a selected article. In an embodiment, a processor may receive an indication of a selected article from a user interface of a vending machine. For instance, a user may enter a selection of an article using a user interface such as, for instance, a touch screen, a touch pad or a keyboard, and this selection may be transmitted to and received 300 by a processor.

In another embodiment, a processor of a vending machine may receive 300 an indication of a selected article from a mobile electronic device. For instance, a mobile electronic device may include an application through which a user may select an article. In certain embodiments, a mobile electronic device may determine one or more vending machines in the vicinity of the mobile electronic device such as through GPS or short-range communication technology such as Bluetooth. A mobile electronic device may receive an indication of one or more available articles at one or more of the determined vending machines, and may cause a depiction of one or more of the articles, such as, for example, a picture, a description and/or the like, to be displayed to a user via the mobile electronic device. A user may select a desired article from the presented options, and the mobile electronic device may transfer an indication of the user's selection to a processor of the vending machine.

In an embodiment, a processor may receive 302 a selection of one or more content items to be printed on the selected article. A content item may include a picture, a graphic, text, a background, a pattern, a shading, shadowing, a color, a color scheme, a font, a line type, embossing, a cutout, a monogram, a silhouette and/or the like. A processor may receive 302 a selection of one or more content items from a user interface. For instance, a user may use a user interface to select one or more content items to be printed on an article, and this selection may be transmitted to a processor. In some embodiments, a processor may cause a menu of available content items to be displayed to a user via a user interface, and the user interface may receive a selection of one or more of the displayed content items. In other embodiments, a user may specify one or more custom content items to be printed on an article. For instance, a user may use one or more design tools such as, for example, drawing, photography or other tools to design one or more content items. As another example, a user may upload one or more content items to a vending machine using a user interface. For instance, a user interface may include a USB port, an SD card slot or other mechanism by which a user can transfer or upload one or more content items to a user interface. A user may select one or more uploaded content items.

In various embodiments, a processor may receive 302 a selection of one or more content items from a camera. A user may use a camera of a vending machine to take one or more pictures, which may be used as content items. For instance, a user may use a camera of a vending machine to capture an image of the user or anything that is in view of the camera. A camera may send one or more captured images to a processor of the vending machine.

In some embodiments, a processor may receive 302 a selection of one or more content items from a mobile electronic device. For instance, a mobile electronic device may cause a menu of available content items for one or more vending machines to be displayed to a user via the mobile electronic device. In other embodiments, a user may specify one or more custom content items to be printed on an article using a mobile electronic device. For instance, a user may use one or more design tools such as, for example, drawing, photography or other tools to design one or more content items. As another example, a user may select one or more content items from a memory of a mobile electronic device or a memory in communication with a mobile electronic device to use as a content item. For instance, a user interface may select one or more pictures from a picture roll or other list using a mobile electronic device. A mobile electronic device may send one or more selected content items to a processor of a vending machine.

In an embodiment, a processor may generate 304 and cause a display device to output a final visual display to be printed on an article. A processor may generate 304 a final visual display by combining one or more of the received content items with one or more background content items. A background content item may be a content item that cannot be changed, altered or modified by a user. For example, a user may wish to purchase a customized soda can at a baseball game. The user may customize a picture to be displayed on a portion of the soda can, but the user may not be able to change the text that is displayed on the soda can such as, for instance "Little League—Tigers vs. Lions—Jul. 6, 2015."

In an embodiment, one or more background content items may be assigned to particular vending machine or article design by an administrator. In other embodiments, one or more content items may be determined based on a selection of a user. For instance, when a user selects an article, a user may have the ability to select a template associated with the article. A template may include one or more customizable areas where a user may add user-provided content items and/or one or more background content items. In certain embodiments, a final visual display may only include the selected content items if no background content items are designated.

In an embodiment, a processor may cause 304 a selected article to be positioned in a printing area of the vending machine. In certain embodiments, an article may be positioned in a printing area when the vending machine is loaded or stocked. In other embodiments, a processor may cause 304 an article to be physically moved from an article holding area to a printing area. For instance, a processor may instruct a movable positioner, such as an arm of the machine, a movable pedestal and/or the like, to move an article to a printing area.

In an embodiment, an article may include a film on at least a portion of the outside of an article. A film substrate may be a substrate that changes color or on which a design may appear when energy is applied to it. In some embodiments, the film may be a color forming film. An example film is ZINK Paper®. For instance, when heat from a ZINK-enabled printer activates molecules embedded in ZINK Paper®, color may emerge on the paper. In certain embodiments, the color that emerges may be dependent on the amount and/or intensity of the energy that is applied.

In various embodiments, an energy generating print device may be a thermal printing device, a radiant printing device, and/or the like. A thermal printing device may apply heat to a film substrate such as, for example, a ZINK-enabled printer. A thermal printing device may include one or more printheads and/or one or more rollers. A printhead may include an array of energy-generating elements, which may be in physical and/or thermal contact with a film.

In an embodiment, a radiant printing device may apply radiant energy to a film substrate. One or more energy-generating elements of a printhead of a radiant printing device may include a laser. For example, a low power $CO_2$ laser may be used to apply energy to a film.

A printhead may be in communication with one or more processors. A processor may control an intensity and/or duration of energy generated by one or more printheads. For example, a processor may control an amount of power provided to one or more printheads, which may in turn control the amount of energy generated by one or more of the energy-generating elements. In certain embodiments, an energy generating print device may apply energy to a film by passing the film between one or more printheads and one or more rollers. For instance, an article having a film applied thereto may be passed between one or more printheads and one or more rollers. Alternatively, a film may be passed between one or more printheads and one or more rollers and then applied to an article.

For example, an article may be positioned in a vending machine with a film pre-applied to the article. In other embodiments, a processor may cause a film to be applied to an article. For instance, a processor may cause a film applying apparatus or dispenser to apply a film substrate on at least a portion of an article. In various embodiments, a processor may cause a film to be applied to an article after the article is positioned in a printing area.

In an embodiment, a processor may cause 306 a visual representation of one or more content items to be printed on an article. A processor may cause 306 a visual representation of one or more content items to be printed on an article by sending one or more instructions to an energy generating print device to selectively apply energy to at least a portion of the film of the article. The instructions may include instructions about one or more locations or positions on the film to which energy is to be applied. In certain embodiments, the instructions may include instructions pertaining to a certain design, content item and/or the like. The instructions may include instructions pertaining to an amount of energy to apply to a particular film position, an intensity of energy to apply to a particular film position and/or the like. An energy generating print device may be an electronic device that selectively applies energy to a film to produce one or more designs or representations of content items. Examples of an energy generating device may include, without limitation, inkless printers such as, for instance, ZINK-enabled devices.

In certain embodiments, an energy generating print device may receive 308 the instructions, and may apply 310 energy to the selected article in accordance with the received instructions. In various embodiments, an energy generating print device may apply energy via one or more printheads. In other embodiments, the energy that is applied may be generated from one or more lasers of an energy generating print device. For instance, an energy generating print device may apply 310, via one or more printheads, energy having a certain intensity for a certain period of time and at a certain position on the article in accordance with one or more received instructions. As energy is applied to the film of an article, the color activated depends on the temperature and time of application. For example, if an energy generating print device is to activate one color, its temperature may not be hot enough and/or it won't be applied long enough to activate a second color.

In an embodiment, a processor of a vending machine may cause a printed article to be positioned in a dispensing portion of the vending machine. For instance, a processor may send one or more instructions to a printing area of a vending machine to move or otherwise cause a printed article to be positioned in a dispensing portion of the vending machine. In various embodiments, a user may be able to retrieve the printed article from the dispensing portion. A dispensing portion may include for instance, a slot, a tray, an opening and/or the like.

Figure 4:
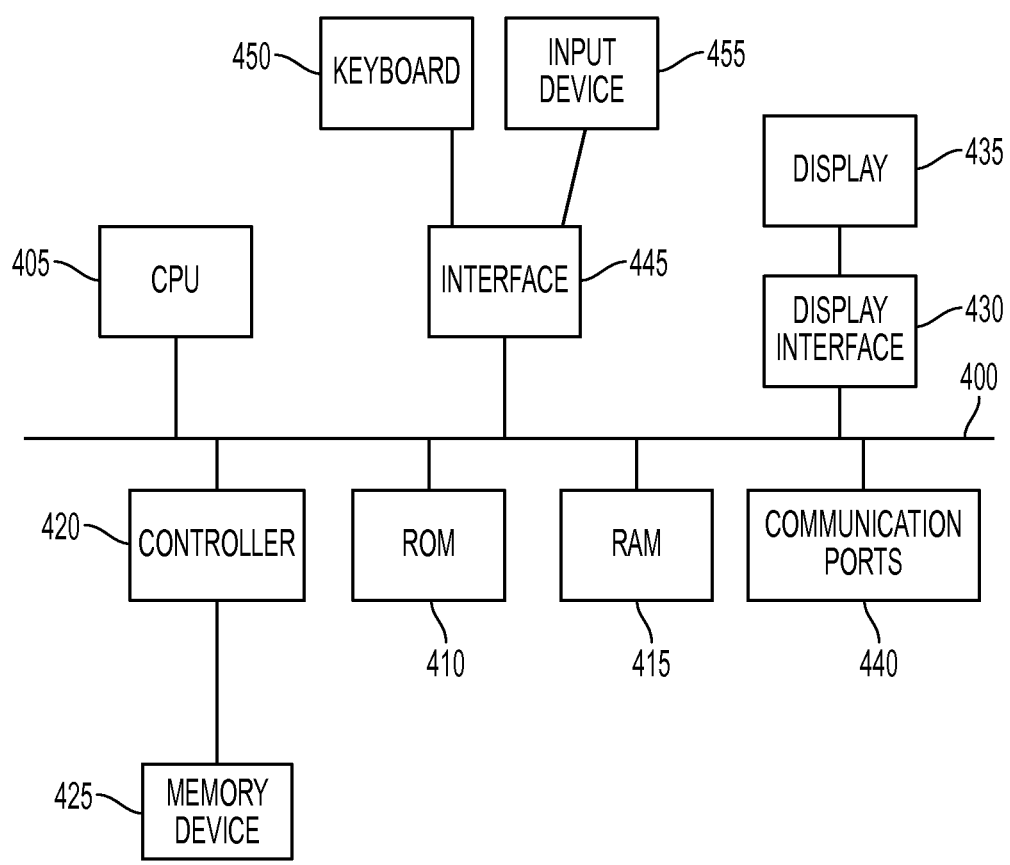
FIG. 4 illustrates a block diagram of example hardware that may be used to contain or implement program instructions according to an embodiment.

FIG. 4 depicts a block diagram of hardware that may be used to contain or implement program instructions. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an example of a production device, computing device or processor as such terms are used within this disclosure.

CPU 405 represents one or more processors that perform calculations and logic operations required to execute a program. Any number of processors may be available, and they may be part of a single electronic device or distributed across any number of networked electronic devices. The processor(s) may access a computer-readable memory device 425 containing programming instructions.

When this document and any claim uses the term "processor," then unless specifically stated otherwise it is intended to refer to all such embodiments (i.e., single processor or multiple processors). When this document or any claim in the document uses the term "computer-readable memory," "computer-readable medium," or similar phrases, then unless specifically stated otherwise it is intended to refer to embodiment that include a single device, embodiments in which data is distributed across multiple devices, and embodiments relating to various sectors of a single device. Read only memory (ROM) 410 and random access memory (RAM) 415 constitute examples of non-transitory computer-readable storage media.

A controller 420 interfaces with one or more optional non-transitory computer-readable storage media 425 to the system bus 400. These storage media 425 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 410 and/or the RAM 415. Optionally, the program instructions may be stored on a tangible, non-transitory computer-readable medium such as a compact disk, a digital disk, flash memory, a memory card, a USB drive, an optical disc storage medium and/or other recording medium.

An optional display interface 430 may permit information from the bus 400 to be displayed on the display 435 in audio, visual, graphic or alphanumeric format. Communication with external devices, such as a printing device, may occur using various communication ports 440. A communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A system for dispensing a customized article, the system comprising:
    a vending machine comprising:
        an article holding area comprising one or more articles, wherein each article comprises a film on at least a portion of an outside surface of the article,
    an energy generating print device comprising a radiant printing device,
    a processor, and
    a non-transitory computer-readable storage medium that comprises one or more programming instructions that, when executed, cause the processor to:
        receive an indication of a selected article,
        receive a selection of one or more content items to be printed on the selected article,
        identify one or more background content items associated with the selected article,
        generate a final visual display by combining the received content items and the identified background content items, and
        cause the energy generating print device to apply energy to the portion of the selected article having the film, wherein applying such energy causes a visual representation of the final visual display to be displayed on the portion of the selected article.

2. The system of claim 1, wherein the one or more programming instructions that, when executed, cause the processor to receive an indication of a selected article comprises one or more programming instructions that, when executed, cause the processor to receive an indication of a selected article from a user interface of the vending machine.

3. The system of claim 1, wherein the one or more programming instructions that, when executed, cause the processor to receive an indication of a selected article comprises one or more programming instructions that, when executed, cause the processor to receive an indication of a selected article from a mobile electronic device in communication with the processor over a communication network.

4. The system of claim 1, wherein the one or more programming instructions that, when executed, cause the processor to receive a selection of one or more content items to be printed on the selected article comprise one or more programming instructions that, when executed, cause the processor to receive a selection of one or more content items to be printed on the selected article from a user interface of the vending machine.

5. The system of claim 4, wherein the one or more programming instructions that, when executed, cause the processor to receive a selection of one or more content items from a user interface of the vending machine comprise one or more programming instructions that, when executed, cause the processor to receive one or more content items from a camera of the user interface.

6. The system of claim 1, wherein the one or more programming instructions that, when executed, cause the processor to receive a selection of one or more content items comprise one or more programming instructions that, when executed, cause the processor to receive a selection of one or more content items from a mobile electronic device in communication with the processor over a communication network.

7. The system of claim 1, wherein the one or more programming instructions that, when executed, cause the processor to cause the energy generating print device to apply energy to the portion of the selected article having the film comprise one or more programming instructions that, when executed, cause the processor to send one or more printing instructions to the energy generating print device, wherein the printing instructions comprise information pertaining to one or more periods of time and one or more intensities with which energy is to be applied to the film to cause the visual representation of the selected content items to be displayed on the portion of the selected article.

8. The system of claim 1, wherein the computer-readable storage medium further comprises one or more programming instructions that, when executed, cause the processor to cause the selected article to be moved from the article holding area to a printing area of the vending machine.

9. The system of claim 8, wherein the computer-readable storage medium further comprises one or more programming instructions that, when executed, cause the processor to cause the selected article to be moved from the printing area to a dispensing area of the vending machine.

10. The system of claim 1, wherein the energy generating printing device comprises a thermal printing device.

* * * * *